United States Patent [19]

Hopkins et al.

[11] Patent Number: 5,223,035
[45] Date of Patent: Jun. 29, 1993

[54] POZZOLAN BLENDS

[75] Inventors: Donald S. Hopkins, Thornhill; David B. Oates, Schomberg, both of Canada; Rayburn R. Anderson, Wayzata, Minn.; Paul H. Lehoux, Kingston, Canada

[73] Assignee: Lafarage Canada Inc., Montreal, Canada

[21] Appl. No.: 804,359

[22] Filed: Dec. 9, 1991

Related U.S. Application Data

[63] Continuation of Ser. No. 573,055, Aug. 29, 1990, abandoned.

[51] Int. Cl.⁵ .............................................. C04B 28/22
[52] U.S. Cl. .................................... 106/707; 106/709; 106/710
[58] Field of Search .............. 106/705, 707, 709, 710, 106/716, 735, 736, DIG. 1, 697

[56] References Cited

U.S. PATENT DOCUMENTS

| | | | |
|---|---|---|---|
| 4,268,316 | 5/1981 | Wills, Jr. | 106/709 |
| 4,495,162 | 1/1985 | Jons et al. | 423/171 |
| 4,501,618 | 2/1985 | Gebhard et al. | 106/705 |
| 4,731,120 | 3/1988 | Tuutti | 106/705 |

FOREIGN PATENT DOCUMENTS

| | | | |
|---|---|---|---|
| 2801687 | 7/1979 | Fed. Rep. of Germany | 106/709 |
| 3114555 | 10/1982 | Fed. Rep. of Germany | 106/710 |

Primary Examiner—David Brunsman
Attorney, Agent, or Firm—Bachman & La Pointe

[57] ABSTRACT

An unground, fine pozzolan having a sulphur content determined as wt. % $SO_3$ of 5 to 25 wt. % is employed in admixture with Portland cement to provide a blended hydraulic cement which has increased compressive strength characteristics as well as extended retardation time without the need for separate addition of gypsum; the pozzolan may also be admixed with fly ash to provide a pozzolan blend for use with Portland cement with reduced Portland cement content and use of Class C fly ash; the pozzolan is derived by reaction of coal flue gases with an atomized vapor of slaked lime.

15 Claims, No Drawings

POZZOLAN BLENDS

This is a continuation of application Ser. No. 573,055, filed aug. 29, 1990, now abandoned.

BACKGROUND OF THE INVENTION a) Field of the Invention

This invention relates to the use of a sulphur-containing pozzolan in blended hydraulic cements; more especially the invention relates to a blended hydraulic cement containing the pozzolan and to a pozzolan blend for hydraulic cements.

b) Description of Prior Art

A pozzolan is a siliceous or siliceous and aluminous material which possesses little or no cementitious value, but which, in finely divided form, will react with calcium hydroxide, in the presence of moisture to form a composition with cementitious properties.

Fly ash is a man-made pozzolan resulting from the combustion of coal and typically contains silicon dioxide, aluminium oxide, ferric oxide and calcium oxide with a small amount of sulphur typically not more than 5%, by weight, determined as sulphur trioxide.

Portland cement or clinker is a mixture of compounds, the main compounds being tricalcium silicate, dicalcium silicate, tricalcium aluminate and tetracalcium aluminoferrite. The binding or cementitious quality of Portland cement results from the hydration reaction between the cement and water. In particular, the two calcium silicates form calcium hydroxide and a calcium silicate hydrate which is the most important cementing component.

The rate of the hydration reaction can be regulated by the addition of a retarder, for example, gypsum; and also by fine grinding of the cement, but grinding of cement components is costly in energy and time consuming, addition of gypsum also increases cost.

Pozzolans are used with Portland cement in concrete production. Concrete is a mixture of the cement, water and mineral aggregate. The pozzolan may be added separately from the Portland cement at the concrete mix plant, or it may be premixed with Portland cement to form a blended cement.

SUMMARY OF THE INVENTION

It is an object of this invention to provide a blended hydraulic cement containing an otherwise waste sulphur-containing pozzolan.

It is a further object of this invention to provide a blend of pozzolan materials for hydraulic cements, providing advantages in such cements.

It is yet another object of this invention to provide concrete and concrete articles derived from the hydraulic cements of the invention.

It is still a further object of this invention to provide a hydraulic cement employing the blend of pozzolan materials.

It has now been found that a waste sulphur-containing pozzolan derived from reaction of coal flue gases with an aqueous vapor of slaked lime is of greater fineness than prior fly ash materials and has a high sulphur content, particularly in the form of calcium sulphates.

The sulphur-containing pozzolan can be used to advantage with Portland cement avoiding the need for separate addition of a retarder such as gypsum. The resulting cements have comparable or increased compressive strengths, as compared with cements containing conventional fly ash as a pozzolan component.

The fineness of the sulphur-containing pozzolan avoids the need for grinding operations and provides advantages over conventional fly ashes which do not exhibit the high degree of fineness of the sulphur-containing pozzolan.

In accordance with one aspect of the invention a blended hydraulic cement comprises a mixture of Portland cement particles and an unground, fine pozzolan having a sulphur content determined as wt. % $SO_3$ of 5 to 25 wt. %, such sulphur content being the sole sulphur component of the cement.

In another aspect of the invention a particulate pozzolanic blend comprises a mixture of fly ash particles and an unground, fine pozzolan having a sulphur content determined as wt. % $SO_3$ of 5 to 25 wt. %.

DESCRIPTION OF PREFERRED EMBODIMENTS i) Pozzolite

The sulphur-containing pozzolan of the invention is referred to herein as pozzolite.

ii) Production of Pozzolite

Pozzolite is derived from the flue gases generated by the burning of sub-bituminous coal. The flue gases are directed into a lime spray drying adsorption vessel in which a slurry of finely ground, slaked pebble lime is atomized. A fog or vapor of aqueous slaked lime is created by forcing the slaked lime through a finely perforated rotary atomizer spinning at high speed in the adsorption vessel. During the 10 to 15 seconds of atomization or evaporative drying of the slaked lime, the acid components of the flue gas, principally sulphur dioxide, react with the fog particles to form the pozzolite.

The pozzolite employed in the data herein was produced at the Sherburne County Generating Plant—Unit No. 3 of Northern States Power, Becker, Minn., U.S.A. The coal was a sub-bituminous Westmoreland coal and the atomizer was obtained from Niro Atomizer AS of Denmark, which comprises a finely perforated stainless steel atomizer spinning at high speed.

The pozzolite produced is pneumatically transferred to storage silos and is produced in an amount of up to 1,600 tons per day.

iii) Characteristics of Pozzolite

Pozzolite has a blaine fineness of 7,000 to 10,000 $cm^2/g$, more usually 7,250 to 9,750 $cm^2/g$, and a content of sulphur determined as wt. % $SO_3$ of 5 to 25 wt. %, generally 7 to 24 wt. %, typically 12 to 20 wt. %, more usually 15 to 18 wt. %.

By way of comparison, conventional fly ashes have a blaine fineness typically not more than 5,000 $cm^2/g$.

The percentage of pozzolite particles passing #325 sieve ranged from 82% to 97%. More than 80%, more especially 84 to 99%, of the unground pozzolite has a particle size less than 50 microns, and generally not more than about 3% is retained on a #325 sieve.

The specific gravity of pozzolite ranges from 2.43 to 2.53 $g/cm^3$.

Table I below shows the particle size distribution for 12 production lots. Particle sizes were determined by a Master Particle Sizer from Malvern Instruments.

TABLE 1

POZZOLITE PARTICLE SIZE DATA

| Size, % Passing | 2673 | 2674 | 2677 | 2680 | 2683 | 2704 | 2686 | 2689 | 2692 | 2697 | 2698 | 2701 | Range |
|---|---|---|---|---|---|---|---|---|---|---|---|---|---|
| 100 Microns | 99.2 | 99.2 | 100.0 | 99.9 | 99.9 | 99.9 | 100.0 | 100.0 | 100.0 | 99.9 | 100.0 | 99.9 | 100–99.2 |
| 90 Microns | 98.0 | 98.1 | 100.0 | 99.9 | 99.9 | 99.9 | 99.8 | 99.9 | 99.8 | 99.8 | 99.9 | 99.6 | 100–98.0 |
| 80 Microns | 96.1 | 96.2 | 99.6 | 99.8 | 99.8 | 99.8 | 99.4 | 99.6 | 99.4 | 99.6 | 99.5 | 99.1 | 99.8–96.1 |
| 70 Microns | 93.3 | 93.6 | 98.8 | 99.7 | 99.6 | 99.7 | 98.4 | 98.8 | 98.5 | 99.5 | 98.7 | 98.2 | 99.7–93.3 |
| 60 Microns | 89.6 | 90.0 | 96.9 | 99.7 | 99.6 | 99.6 | 96.5 | 96.9 | 96.6 | 99.3 | 96.8 | 96.4 | 99.7–89.6 |
| 50 Microns | 84.8 | 85.2 | 92.9 | 98.9 | 98.9 | 99.0 | 92.6 | 93.2 | 93.1 | 98.6 | 93.2 | 93.1 | 99.0–84.8 |
| 40 Microns | 78.7 | 79.2 | 86.2 | 93.8 | 94.4 | 94.9 | 86.2 | 87.0 | 87.0 | 94.8 | 87.2 | 87.8 | 94.9–78.7 |
| 30 Microns | 71.6 | 72.0 | 78.5 | 85.9 | 86.8 | 87.3 | 78.4 | 79.7 | 78.8 | 87.7 | 79.6 | 80.0 | 87.3–71.6 |
| 20 Microns | 61.3 | 61.5 | 66.8 | 74.5 | 77.0 | 76.3 | 66.5 | 68.8 | 66.8 | 77.1 | 68.0 | 68.3 | 77.0–61.3 |
| 10 Microns | 44.3 | 44.0 | 46.4 | 52.9 | 56.1 | 53.0 | 46.0 | 48.7 | 46.0 | 54.3 | 47.2 | 47.1 | 56.1–44.0 |
| 9 Microns | 41.5 | 41.5 | 42.9 | 49.3 | 53.1 | 49.4 | 42.7 | 45.3 | 42.8 | 50.4 | 43.7 | 43.8 | 53.1–41.5 |
| 8 Microns | 38.4 | 38.8 | 39.0 | 45.2 | 49.4 | 45.0 | 39.0 | 41.5 | 39.1 | 45.7 | 39.7 | 40.0 | 49.4–38.4 |
| 7 Microns | 35.2 | 35.8 | 35.1 | 40.4 | 45.0 | 40.2 | 35.0 | 37.5 | 35.0 | 40.0 | 35.5 | 35.7 | 45.0–35.0 |
| 6 Microns | 31.8 | 32.3 | 30.8 | 35.1 | 39.6 | 34.4 | 30.8 | 33.2 | 30.3 | 33.3 | 30.9 | 30.7 | 39.6–30.3 |
| 5 Microns | 27.8 | 28.1 | 25.7 | 28.8 | 33.2 | 27.7 | 25.9 | 28.3 | 25.1 | 25.6 | 25.7 | 24.7 | 33.2–25.1 |
| 4 Microns | 21.9 | 22.6 | 18.9 | 20.8 | 25.2 | 19.8 | 19.4 | 21.6 | 18.9 | 17.3 | 18.9 | 17.4 | 25.2–17.3 |
| 3 Microns | 12.4 | 13.3 | 9.7 | 10.2 | 13.3 | 10.1 | 10.1 | 11.8 | 9.6 | 8.1 | 9.6 | 8.6 | 13.3–8.1 |
| 2 Microns | 4.2 | 4.3 | 2.7 | 2.6 | 3.6 | 2.5 | 2.9 | 3.7 | 2.8 | 1.8 | 2.7 | 2.0 | 4.3–1.8 |

Pozzolite comprises an amorphous component and a crystalline component; typically about 65 to 75% by wt., preferably about 70% by wt. amorphous component and 25 to 35% by wt., preferably about 30% by wt. crystalline component.

The amorphous component is similar to fly ash. The crystalline component contains about one-third gypsum, about one-sixth total of bassanite and calcium sulphate anhydrite; about one-sixth portlandite with the remaining one-third being calcium sulphite, quartz and calcite.

The chemical and physical characteristics of pozzolite compared with Portage, High Bridge both Type C fly ashes are set out in Table 2 below.

The crystalline portion of pozzolite reacts with lime liberated in the hydration of Portland cement yielding calcium silicate hydrate. In addition sulpho-aluminate-ettringate having cementation characteristics is formed.

The extreme fineness of pozzolite assures a more complete reaction of the components and the sulphate components retard the hydration of the blended cement until the curing cycle; in this way the strength gain of the cement is maximized.

A comparative analysis of the chemical composition of Portland Cement (Alpena-Type I manufactured to ASTM:C150-Type I) and pozzolite is set out in Table 3 below.

TABLE 2

COMPARATIVE DATA - FLY ASH TO POZZOLITE

| Chemical Composition | Pozzolite Average | Pozzolite Range | Portage | High Bridge | ASTM, C618 Type C |
|---|---|---|---|---|---|
| Silicon Oxide, $SiO_2$ | 26.14 | 22.08–29.94 | 33.9 | 35.9 | — |
| Aluminum Oxide, $Al_2O_3$ | 15.49 | 16.82–14.17 | 18.4 | 16.9 | — |
| Iron Oxide, $Fe_2O_3$ | 4.03 | 7.55–2.42 | 6.2 | 6.6 | — |
| TOTAL | 45.66 | | 58.5 | 59.4 | 50 min. |
| Calcium Oxide, CaO | 25.91 | 28.48–23.29 | 26.7 | 25.5 | — |
| Sulfur Trioxide, $SO_3$ | 16.37 | 19.50–13.22 | 3.6 | 2.5 | 5 max. |
| Magnesium Oxide, MgO | 2.84 | 3.35–2.29 | | | — |
| Alkalies as $Na_2O$ | 2.67 | 3.35–1.65 | | 2.17 | — |
| Moisture Content | — | — | 0.06 | 0.04 | 3 max. |
| Loss on Ignition | 5.17 | 6.23–4.09 | 0.21 | 0.32 | 6 max. |
| Physical Properties | | | | | |
| Fineness +325 sieve, % | 8.8 | 18.1–2.6 | 12.7 | 14.0 | 34 max. |
| Pozzolanic Activity Index | | | | | |
| Portland Cement @ 28 day, % | 87 | — | 97 | 98 | 75 min. |
| Lime @ 7 day, psi | 1105 | — | 1360 | — | — |
| Water Requirement, % | 100 | — | 88 | 89 | 105 min. |
| Soundness, % | — | — | 0.11 | 01.2 | 0.8 max. |
| Specific Gravity | 2.47 | 2.43–2.53 | 2.67 | 2.70 | — |

TABLE 3

Chemical Characteristics of Pozzolite and Cement

| | $SiO_2$ | $Al_2O_3$ | $TiO_2$ | $P_2O_5$ | $Fe_2O_3$ | CiO | MoO | $Na_2O$ | $K_2O$ | $SO_3$ | LOI |
|---|---|---|---|---|---|---|---|---|---|---|---|
| Pozzolite (Rec'd 8/88) | 28.9 | 14.9 | 0.57 | 0.39 | 2.62 | 26.7 | 3.58 | 2.02 | 0.61 | 16.1 | 3.83 |
| Alpena (Type 1) | 20.8 | 4.85 | 0.28 | 0.08 | 2.80 | 64.5 | 2.08 | 0.18 | 0.97 | 2.8 | 0.74 |

The compounds found in the above materials are:

| | Pozzolite | Alpena Type 1 |
|---|---|---|
| % gypsum $CaSO_4 2H_2O$ (by TGA/DSC) | 10.7 | |

TABLE 3-continued

| Chemical Characteristics of Pozzolite and Cement | | |
| --- | --- | --- |
| % Bassanite $CaSO_4$ $0.5H_2O$ (by TGA/DSC) | 3.5 | |
| % anhydrite $CaSO_4$ (by XRD) | 1.5 | |
| % calcium sulfite hydrate $CaSO_3$ $0.5H_2O$ (by TGA) | 6.5 | |
| % quartz .$SiO_2$ (by XRD) | 1.7 | |
| % portlandite $Ca(OH)_2$ (by TGA) | 5.5 | |
| % calcite (by TGA/XRD) | 1.0 | |
| % Fly ash (by difference) | 69.6 | |
| % $C_3S$ (Bogue potential) | | 61 |
| % $C_2S$ (Bogue potential) | | 13 |
| % $C_3A$ (Bogue potential) | | 8.1 |
| % $C_4AF$ (Bogue potential) | | 8.5 | iv) Blended Hydraulic Cements

Blended hydraulic cements based on Portland cement and pozzolite suitably contain 75 to 90%, by wt. of the Portland cement and 10 to 25%, by wt. of pozzolite, to a total of 100%.

The sulphur content of the pozzolite provides the calcium sulphate to retard setting of the cement.

Portland cement has a blaine fineness of about 3,800 $cm^2/g$ so that the greater fineness of the pozzolite results in a generally greater average fineness in the blend.

Strength comparison data demonstrate that the inclusion of pozzolite can provide increased compressive strength as well as retarding the setting time thereby permitting working of the cement over an extended period. The data is tabulated in Table 4 below.

TABLE 4

POZZOLITE BLENDED HYDRAULIC CEMENT

| Proportions | Control | 1 | 2 | 3 | 4 | ASTM: C595 Type IP |
| --- | --- | --- | --- | --- | --- | --- |
| Clinker, % | | 84.9 | 83.8 | 80.6 | 77.5 | — |
| Pozzolite, % | None | 15.1 | 16.2 | 19.4 | 22.5 | — |
| Terra Alba, % | | None | None | None | None | — |
| $SO_3$ % | 2.5 | 2.5 | 3.0 | 3.5 | 4.0 | — |
| Physical Properties | | | | | | |
| Setting Time, min. | 100 | 240 | 290 | 330 | 340 | 45–420 min. |
| Soundness, % | +0.175 | +0.099 | +0.088 | +0.085 | +0.078 | +0.50 max. |
| Expansion, % | +0.010 | +0.011 | +0.011 | +0.011 | +0.009 | 0.020 max. |
| Strength, ksi | | | | | | |
| 3-day | 22.8 | 22.6 | 24.6 | 24.4 | 24.4 | 18.0 |
| 7-day | 29.5 | 30.1 | 31.5 | 31.7 | 30.1 | 28.0 |
| 28-day | 39.1 | 41.0 | 41.4 | 43.4 | 43.6 | 35.0 |
| Blaine Fineness, $cm^2/g$ | 4020 | 4770 | 4935 | 5175 | 5480 | — | v) Pozzolan Blends

Blends of pozzolite and fly ash when employed with Portland cement produce a blended cement, and, when further mixed with mineral aggregate, a concrete, of increased compressive strength while permitting greater substitution of Portland cement by the pozzolan blend.

The pozzolan blend, referred to herein as pozzolite LPC, suitably contains in weight %, about 70 to 90%, preferably about 80% of fly ash and 10 to 30%, preferably about 20% pozzolite.

The fly ash component may comprise a mixture of different fly ashes with different characteristics, for example, Riverside fly ash and Portage fly ash.

Thus a particular pozzolite LPC contains in weight %, 10 to 30% pozzolite, 35 to 45% Riverside fly ash and 35 to 45% Portage fly ash.

In particular the fly ash component may contain substantially equal amounts of Riverside fly ash and Portage fly ash. Riverside fly ash is produced at the Riverside Coal Burning Plant in Minneapolis from western coal; the fly ash is collected in a bag house and is finer than most fly ashes with less than 10% retained on a #325 sieve.

A chemical and physical analysis of Riverside fly ash and Portage fly ash is set out in Table 5 below.

Riverside fly ash and Portage fly ash are both Class C fly ashes, in that they have cementitious characteristics.

TABLE 5

CHEMICAL AND PHYSICAL ANALYSIS OF RIVERSIDE AND PORTAGE FLY ASH

| | Riverside | Portage | ASTM. C618 Class C |
| --- | --- | --- | --- |
| Chemical Composition | | | |
| Silicon Dioxide ($SiO_2$), % | 36.2 | 33.9 | |
| Aluminum Oxide ($AL_2O_3$), % | 17.2 | 18.4 | |
| Iron Oxide ($Fe_2O_3$), % | 5.8 | 6.2 | |
| TOTAL: | 59.2 | 58.5 | 50 minimum |
| Calcium Oxide (CaO), % | 25.4 | 26.7 | |
| Sulfur Trioxide ($SO_3$), % | 2.1 | 3.6 | 5 maximum |
| Alkalies as $Na_2O$, % | 1.8 | — | |
| Moisture Content, % | 0.06 | 0.06 | 3 maximum |
| Loss on Ignition, % | 0.4 | 0.2 | 6 maximum |
| Physical Properties | | | |
| Fineness, +325 sieve, % | 8.9 | 12.7 | 34 maximum |
| Pozzolanic Activity Index | | | |
| Portland Cement @ 28 days, % | 99 | 97 | 75 minimum |
| Lime @ 7 days, psi | — | 1360 | 800 minimum |
| Water Requirement, % | 87 | 88 | 105 maximum |
| Soundness, % | 0.09 | 0.11 | 0.8 maximum |
| Specific Gravity | 2.63 | 2.67 | |

Pozzolite LPC based on a blend of 40% Riverside fly ash, 40% Portage fly ash and 20% pozzolite has a specific gravity of 2.49 to 2.55 $g/cm^3$, average about 2.51 $g/cm^3$ and has a fineness such that 13.5 to 20%, usually about 16%, is retained on a #325 sieve. The blend has a sulphur content, determined as wt. % $SO_3$, of 4 to 5%, preferably about 4.6%.

Tables 6, 7 and 8 below demonstrate compressive strengths which can be obtained employing pozzolite LPC, while reducing the Portland cement content, by replacing part of the Portland cement with pozzolite LPC, in bubble cure, low pressure cure and autoclave cure blocks. Bubble cure, low pressure cure and autoclave cure are all known temperature cure methods for concrete, which employ steam in the curing.

Increased compressive strength was exhibited in bubble cured blocks of Table 6 and autoclave cured blocks of Table 8 with low pressure cured blocks providing acceptable results.

TABLE 6

BUBBLE CURED BLOCK USING POZZOLITE LPC

| Block, Proportions, lbs/batch | | | |
|---|---|---|---|
| Portland Cement, Type III | 850 | 650 | |
| Pozzolite, PLC | None | 200 | |
| Sand | 6200 | 6200 | |
| 1" Aggregate | 1600 | 1600 | |
| Yield | 300 - 8" Block | 300 - 8" Block | |
| Compressive Strength, psi | | | ASTM: C90 |
| 1-day Bottom Shelf | 1100 | 980 | |
| Middle Shelf | 1110 | 1050 | |
| Top Shelf | 1370 | 1370 | |
| Average | 1190 | 1130 | — |
| 3-day Bottom Shelf | 1270 | 1000 | |
| Middle Shelf | 1250 | 1300 | |
| Top Shelf | 1370 | 1330 | |
| Average | 1300 | 1210 | — |
| 7-day Bottom Shelf | 1260 | 1310 | |
| Middle Shelf | 1300 | 1210 | |
| Top Shelf | 1300 | 1400 | |
| Average | 1290 | 1310 | — |
| | | | 1000 psi min. |

TABLE 7

LOW PRESSURE CURED BLOCK USING POZZOLITE LPC

| Mix No: | 1 | 2 | 3 | 4 | 5 | 6 | 7 | ASTM: C90 |
|---|---|---|---|---|---|---|---|---|
| Proportions Cement, % | 100 | 80 | 65 | 60 | 50 | 40 | 20 | |
| Pozzolite LPC, % | none | 20 | 35 | 40 | 50 | 60 | 80 | |
| Compressive Strength | | | | | | | | |
| Age, days | 5 | 5 | 5 | 5 | 5 | 5 | 5 | |
| Trial 1, psi | 1810 | 1610 | 1660 | 1520 | 1410 | 1260 | 720 | |
| Trial 2, psi | 1730 | 1810 | 1710 | 1540 | 1390 | 1210 | 620 | |
| Trial 3, psi | 1810 | 1610 | 1660 | 1510 | 1460 | 1270 | 700 | |
| Average, psi | 1780 | 1670 | 1680 | 1520 | 1420 | 1250 | 680 | 1000 minimum |

TABLE 8

AUTOCLAVE CURED BLOCK USING POZZOLITE LPC

| | 1 | 2 | 3 | 4 | 5 | 6 | 7 | 8 | ASTM C:90 |
|---|---|---|---|---|---|---|---|---|---|
| Proportions, lbs/batch | | | | | | | | | |
| Portland Cement, Type III | 300 | 260 | 300 | 275 | 250 | 260 | 260 | 225 | |
| Silica Flour | 250 | 250 | none | none | none | none | none | none | |
| Pozzolite LPC | none | none | 250 | 275 | 300 | 250 | 225 | 260 | |
| Aggregate | 6000 | 6000 | 6000 | 6000 | 6000 | 6000 | 6000 | 6000 | |
| Compressive Strength @ 3 days, psi | | | | | | | | | |
| Test 1 | 1990 | 1940 | 1910 | 1920 | 1680 | 1770 | 1900 | 2020 | |
| Test 2 | 1750 | 1850 | 1980 | 1930 | 1860 | 1700 | 1820 | 1850 | |
| Test 3 | 1980 | — | 1910 | 1750 | 1880 | 1730 | 1770 | 1880 | |
| Average | 1910 | 1890 | 1930 | 1870 | 1810 | 1740 | 1830 | 1920 | 1000 psi |

Comparison of cements employing pozzolite LPC as pozzolan component, with cements employing Portage fly ash as pozzolan component demonstrates superior compressive strength up to 20% when employing pozzolite LPC. Results are tabulated in Table 9 below.

TABLE 9

POZZOLITE LPC vs. PORTAGE FLY ASH

| Curing: Autoclave | 1 | 2 | 3 | 4 | 5 | 6 | 7 |
|---|---|---|---|---|---|---|---|
| Proportions, lbs/batch | | | | | | | |
| Portland Cement, Type III | 300 | 275 | 250 | 360 | 330 | 300 | 275 |
| Pozzolite LPC | 250 | 275 | 300 | none | none | none | none |
| Portage | none | none | none | 190 | 220 | 250 | 275 |
| Aggregate | 6000 | 6000 | 6000 | 6000 | 6000 | 6000 | 6000 |
| Compressive Strength @ 3 days, psi | | | | | | | |
| Test 1 | 1910 | 1920 | 1680 | 1910 | 1630 | 1730 | 1620 |
| Test 2 | 1980 | 1930 | 1860 | 1820 | 1810 | 1810 | 1450 |
| Test 3 | 1910 | 1750 | 1880 | 2010 | 1680 | 1940 | 1570 |
| Average | 1930 | 1870 | 1810 | 1910 | 1710 | 1830 | 1550 |

Thus blends of pozzolite and fly ash permit the use of greater amounts of Class C fly ash in concrete block production and the sulphur content of the pozzolite provides the retarder function permitting the use of Class C fly ash.

The pozzolite increases the pozzolan material available for reaction while the sulphate content provides a retardation effect. The fineness of the pozzolite assures a more complete reaction.

Suitably the blend is employed with Portland cement in an amount of 20 to 50%, by weight, of the pozzolan blend and 50 to 80%, by weight, of Portland cement.

The pozzolan blends permit the use of lower amounts of the more costly Portland cement, while utilizing an otherwise waste material.

I claim:

1. A concrete article comprising a particulate pozzolanic blend of a mixture of fly ash particles of a Class C flyash having a sulphur content determined as wt. % $SO_3$ of less than 5 wt. % and a blaine fineness of not more than about 5,000 $cm^2/g$, and an unground, fine pozzolan being the product of reaction between flue gases, generated by the burning of sub-bituminous coal, with an atomized slurry of slaked lime, said fine pozzolan having a sulphur content determined as wt. % $SO_3$ of 5 to 25 wt. %, and a blaine fineness of 7,000 to 10,000 $cm^2/g$, said fine pozzolan containing about 65 to 75%, by weight of an amorphous component and 25 to 35%, by weight, of a crystalline component; said blend comprising in weight %, 70 to 90% of said fly ash and 10 to 30% of said fine pozzolan; Portland cement particles; and aggregate; said Portland cement particles comprising 50 to 80%, by weight, based on the weight of said Portland cement and said pozzolanic blend, and said pozzolanic blend comprising 20 to 50%, by weight, based on the weight of said Portland cement and said pozzolanic blend; said article having a compressive strength of at least 1000 psi.

2. A concrete article according to claim 1, wherein said pozzolan contains about 70% by weight of said amorphous component and about 30% by weight of said crystalline component.

3. A concrete article according to claim 2, wherein said amorphous component is a fly ash component and said crystalline component contains about one-third gypsum; about one-sixth total of bassanite and calcium sulphate anhydrite; about one-sixth portlandite and about one-third total calcium sulphite, quartz and calcite.

4. A concrete article according to claim 1, wherein said mixture comprises about 40% of a first Class C fly ash, about 40% of a second Class C fly ash and about 20% pozzolan, and has a specific gravity of 2.49 to 2.55 $g/cm^3$ and a fineness such that 13.5 to 20% is retained on a #325 sieve, said mixture having a sulphur content, determined as wt. % $SO_3$ to 4 to 5%, said first Class C fly ash being characterized as follows:

| Chemical Composition | |
| --- | --- |
| Silicon dioxide ($SiO_2$), % | 36.2 |
| Aluminum Oxide ($AL_2O_3$), % | 17.2 |
| Iron Oxide ($Fe_2O_3$), % | 5.8 |
| TOTAL | 59.2 |
| Calcium Oxide (CaO), % | 25.4 |
| Sulfur Trioxide ($SO_3$), % | 2.1 |
| Alkalies as $Na_2O$, % | 1.8 |
| Moisture Content, % | 0.06 |
| Loss of Ignition, % | 0.4 |
| Physical Properties | |
| Fineness, +325 sieve, % | 8.9 |
| Pozzolanic Activity Index | |
| Portland Cement @ 28 days, % | 99 |
| Lime @ 7 days, psi | — |
| Water Requirement, % | 87 |
| Soundness, % | 0.09 |
| Specific Gravity | 2.63 | and said second Class C fly ash being characterized as follows:

| Chemical Composition | |
| --- | --- |
| Silicon dioxide ($SiO_2$), % | 33.9 |
| Aluminum Oxide ($AL_2O_3$), % | 18.4 |
| Iron Oxide ($Fe_2O_3$), % | 6.2 |
| TOTAL | 58.5 |
| Calcium Oxide (CaO), % | 26.7 |
| Sulfur Trioxide ($SO_3$), % | 3.6 |
| Alkalies as $Na_2O$, % | — |
| Moisture Content, % | 0.06 |
| Loss of Ignition, % | 0.2 |
| Physical Properties | |
| Fineness, +325 sieve, % | 12.7 |
| Pozzolanic Activity Index | |
| Portland Cement @ 28 days, % | 97 |
| Lime @ 7 days, psi | 1360 |
| Water Requirement % | 88 |
| Soundness, % | 0.11 |
| Specific Gravity | 2.67. |

5. A concrete article according to claim 1, wherein said sulphur content of said fine pozzolan is 7 to 24 wt. % and said blaine fineness of said fine pozzolan is 7,250 to 9,750 $cm^2g$.

6. A concrete article according to claim 1, wherein said sulphur content of said fine pozzolan is 12 to 20 wt. % and said blaine fineness of said fine pozzolan is 7,250 to 9,750 $cm^2/g$.

7. A concrete article according to claim 7, wherein said sulphur content of said fine pozzolan is 15 to 18 wt. % and said blaine fineness of said fine pozzolan is 7,250 to 9,750 $cm^2/g$.

8. A concrete article according to claim 7, wherein said fine pozzolan has a specific gravity of from 2.43 to 2.53 $g/cm^3$.

9. A concrete article according to claim 1, wherein said blend comprises in weight %, 80% of said Class C fly ash and 20% of said fine pozzolan.

10. A concrete article according to claim 1, wherein said mixture has a sulphur content, determined as wt. %, $SO_3$ of 4 to 5%.

11. A concrete article according to claim 10, wherein said fly ash comprises a mixture of a first Class C flyash and a second Class C fly ash said first Class C fly ash being characterized as follows:

| Chemical Composition | |
| --- | --- |
| Silicon dioxide ($SiO_2$), % | 36.2 |
| Aluminum Oxide ($AL_2O_3$), % | 17.2 |
| Iron Oxide ($Fe_2O_3$), % | 5.8 |
| TOTAL | 59.2 |
| Calcium Oxide (CaO), % | 25.4 |
| Sulfur Trioxide ($SO_3$), % | 2.1 |
| Alkalies as $Na_2O$, % | 1.8 |
| Moisture Content, % | 0.06 |
| Loss of Ignition, % | 0.4 |
| Physical Properties | |
| Fineness, +325 sieve, % | 8.9 |
| Pozzolanic Activity Index | |
| Portland Cement @ 28 days, % | 99 |
| Lime @ 7 days, psi | — |
| Water Requirement, % | 87 |
| Soundness, % | 0.09 |
| Specific Gravity | 2.63 | and said second Class C fly ash being characterized as follows:

| Chemical Composition | |
| --- | --- |
| Silicon dioxide ($SiO_2$), % | 33.9 |
| Aluminum Oxide ($AL_2O_3$), % | 18.4 |
| Iron Oxide ($Fe_2O_3$), % | 6.2 |
| TOTAL | 58.5 |
| Calcium Oxide (CaO), % | 26.7 |
| Sulfur Trioxide ($SO_3$), % | 3.6 |
| Alkalies as $Na_2O$, % | — |
| Moisture Content, % | 0.06 |
| Loss of Ignition, % | 0.2 |
| Physical Properties | |
| Fineness, +325 sieve, % | 12.7 |
| Pozzolanic Activity Index | |

| -continued | |
|---|---|
| Portland Cement @ 28 days, % | 97 |
| Lime @ 7 days, psi | 1360 |
| Water Requirement % | 88 |
| Soundness, % | 0.11 |
| Specific Gravity | 2.67. |

12. A concrete article according to claim 1, having a compressive strength of at least 1350 psi.

13. A concrete article according to claim 1, having a compressive strength of at least 1700 psi.

14. A concrete article according to claim 1, comprising an autoclave cured article.

15. A concrete article comprising a mixture of 50 to 80%, by weight, Portland cement particles and 20 to 50%, by weight, of a particulate blend of fly ash particles of a Class C fly ash and an unground, fine pozzolan, being the product of reaction between flue gases, generated by the burning of sub-bituminous coal, with an atomized slurry of slaked lime, said blend comprising in weight %, 70 to 90% of said fly ash and 10 to 30% of said fine pozzolan, said pozzolan having a sulphur content determined as wt. % $SO_3$ of 15 to 18 wt. %, a blaine fineness of 7,250 to 9,750 $cm^2/g$, a specific gravity of 2.43 to 2.53 $g/cm^3$; and containing about 65 to 75%, by weight of an amorphous component and 25 to 35%, by weight of crystalline component, said amorphous component being a fly ash component and said crystalline component containing about one-third gypsum; and aggregate, said article being an autoclave cured article having a compressive strength in excess of 1700 psi; said article having a compressive strength up to 20% higher than a corresponding article employing a Class C fly ash instead of said blend.

* * * * *